(No Model.)

G. HUTH.
EAVES TROUGH.

No. 263,046. Patented Aug. 22, 1882.

WITNESSES:
Fred. G. Dieterich
P. C. Dieterich

INVENTOR.
George Huth
by C. A. Snow & Co.
ATTORNEYS.

UNITED STATES PATENT OFFICE.

GEORGE HUTH, OF DELTA, OHIO.

EAVES-TROUGH.

SPECIFICATION forming part of Letters Patent No. 263,046, dated August 22, 1882.

Application filed April 26, 1882. (No model.)

*To all whom it may concern:*

Be it known that I, GEORGE HUTH, of Delta, in the county of Fulton and State of Ohio, have invented certain new and useful Improvements in Eaves-Troughs; and I do hereby declare that the following is a full, clear, and exact description of the invention, which will enable others skilled in the art to which it appertains to make and use the same, reference being had to the accompanying drawings, which form a part of this specification.

Figure 1:
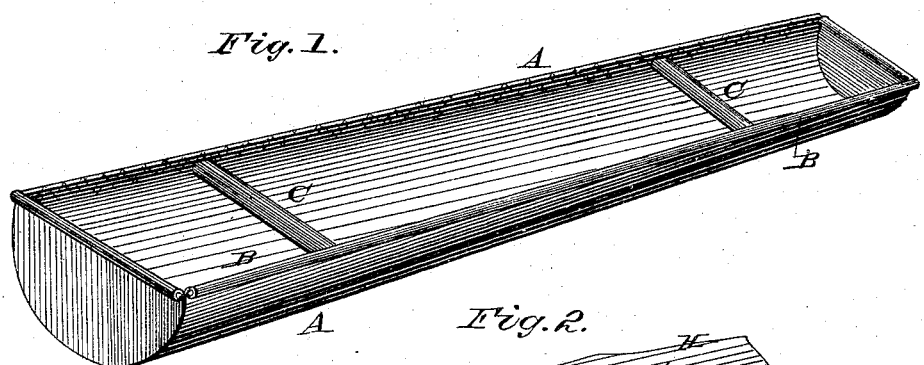
Figure 2:
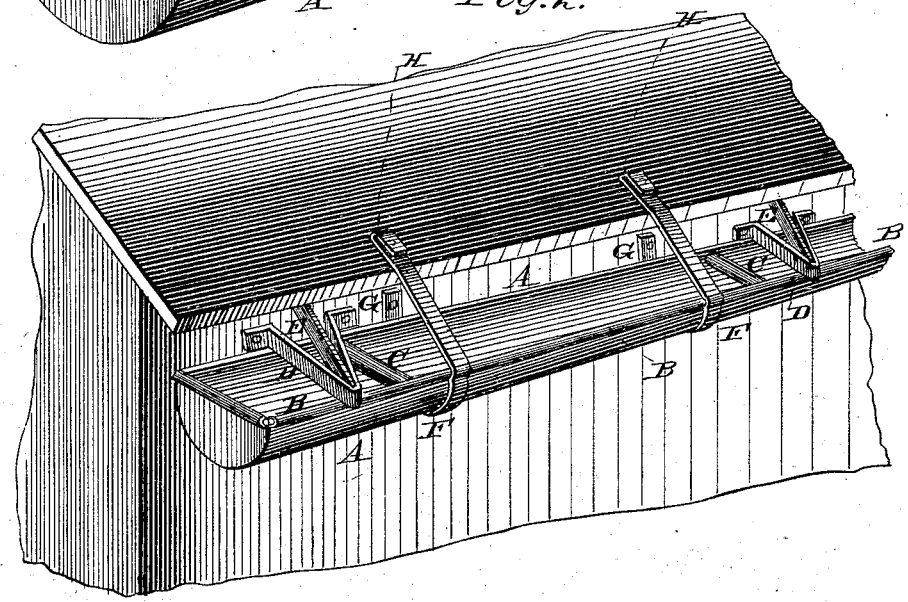
Figure 3:
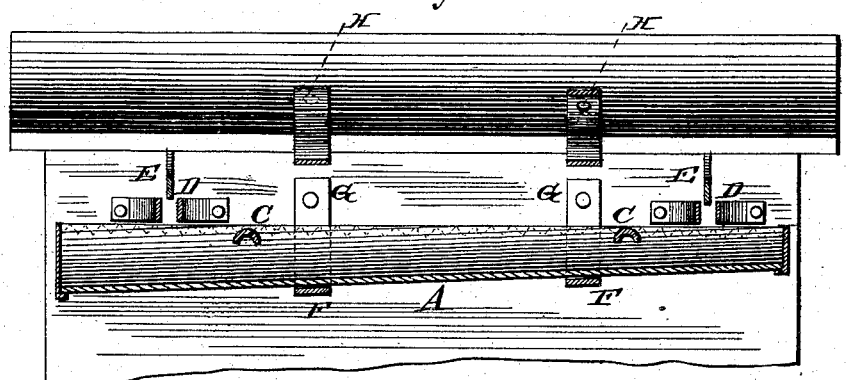

Figure 1 is a perspective view of my improved eaves-trough detached. Fig. 2 is a perspective view, showing the same in position; and Fig. 3 is a longitudinal sectional view.

Corresponding parts in the several figures are denoted by like letters of reference.

This invention relates to eaves-troughs for buildings; and it consists in certain improvements in the construction of the same, which will be hereinafter fully described, and particularly pointed out in the claim.

In the drawings hereto annexed, A represents my improved eaves-trough, which is made tapering in direction of its length, or of gradually-increasing diameter, as shown. Its outer edge is turned over in the usual manner to form the bead B, and its upper edges are connected at suitable intervals by cross pieces or braces C, consisting of strips of tin, rounded, as shown, and secured to the edges of the trough by solder or in any suitable manner.

D D are triangular or V-shaped brackets secured to the side of the building by small nails, and having braces E extending diagonally upward and inward under the cornice, where said braces are nailed or otherwise secured.

F F are strips secured to the side of the building at G and passing under the eaves-trough, which is arranged with its upper sides or edges bearing against the under sides of the brackets. The strips F are from thence passed upward and secured to the roof, as at H, the ends of the strips being turned over the heads of the nails or fastenings, which are thereby protected.

My improved eaves-trough may be hung or adjusted with its upper edges in a horizontal plane, inasmuch as its tapering shape or gradually-increasing diameter gives sufficient fall. The curved or rounded braces C are very strong and readily shed the water into the trough, thus preventing overflow. The trough may be secured closely under the eaves, and is held very securely and rigidly in position by the fastening-strips and the V-shaped brackets.

Having thus described my invention, I claim and desire to secure by Letters Patent of the United States—

The combination of the eaves-trough, made tapering in direction of its length, or of gradually-increasing diameter, the V-shaped brackets having inclined braces, and the fastening-strips, all arranged and operating substantially as and for the purpose set forth.

In testimony that I claim the foregoing as my own I have hereto affixed my signature in presence of two witnesses.

GEORGE HUTH.

Witnesses:
 CALEB BUNDY,
 WILLIAM C. HOUT.